United States Patent
Kazban et al.

(10) Patent No.: US 6,847,641 B2
(45) Date of Patent: Jan. 25, 2005

(54) APPARATUS AND METHODS FOR ESTABLISHING VIRTUAL PRIVATE NETWORKS IN A BROADBAND NETWORK

(75) Inventors: Michael Kazban, Milpitas, CA (US); Mitri Halabi, San Jose, CA (US); Ken Koenig, Saratoga, CA (US); Vinai Sirkay, Los Gatos, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 831 days.

(21) Appl. No.: 09/803,090

(22) Filed: Mar. 8, 2001

(65) Prior Publication Data

US 2002/0126681 A1 Sep. 12, 2002

(51) Int. Cl.[7] .............................................. H04L 12/56
(52) U.S. Cl. ...................................... 370/389; 370/400
(58) Field of Search ................................ 370/230, 389, 370/392, 395.1, 395.2, 395.21, 395.3, 395.5, 400.1, 409, 410, 411

(56) References Cited

U.S. PATENT DOCUMENTS

| | | | |
|---|---|---|---|
| 5,991,300 A | | 11/1999 | Tappan |
| 6,205,488 B1 | * | 3/2001 | Casey et al. ............. 709/238 |
| 6,341,127 B1 | | 1/2002 | Katsube et al. |
| 6,724,722 B1 | * | 4/2004 | Wang et al. ............. 370/229 |
| 6,765,921 B1 | * | 7/2004 | Stacey et al. ............. 370/401 |
| 2002/0097730 A1 | * | 7/2002 | Langille et al. ............. 370/401 |
| 2002/0114274 A1 | * | 8/2002 | Sturges et al. ............. 370/229 |
| 2003/0088699 A1 | * | 5/2003 | Luciani et al. ............. 709/243 |

OTHER PUBLICATIONS

U.S. patent application Ser. No. 09/661,244, filed Sep. 13, 2000; "Apparatus and Methods For Processing Packets In a Broadband Data Stream"; Inventors: Rob Liston et al.
U.S. patent application Ser. No. 09/737,917, filed Dec. 15, 2000; "Apparatus and Method For Scheduling Packets In a Broadband Data Stream"; Inventors: Glenn Gracon et al.
U.S. patent application Ser. No. 09/737,916, filed Dec. 15, 2000; "Apparatus and Method For Managing Packets In a Broadband Data Stream"; Inventors: Joe Keirouz et al.

* cited by examiner

*Primary Examiner*—David Vincent
(74) *Attorney, Agent, or Firm*—Baker Botts L.L.P.

(57) ABSTRACT

Service providers can reduce multiple overlay networks by creating multiple logical service networks (LSNs) on the same physical or optical fiber network. The LSNs are established by the service provider and can be characterized by traffic type, bandwidth, delay, hop count, guaranteed information rates and/or restoration priorities. Once established, the LSNs allow the service provider to deliver a variety of services to customers depending on customer's traffic specifications. Different traffic specifications are serviced on different LSNs, depending on each LSN's characteristics. Such LSNs, once built within a broadband network, can be customized and sold to multiple customers.

20 Claims, 3 Drawing Sheets

APPARATUS AND METHODS FOR ESTABLISHING VIRTUAL PRIVATE NETWORKS IN A BROADBAND NETWORK

RELATED APPLICATIONS

This application relates to an application entitled "Apparatus and Methods for Managing Packets in a Broadband Data Stream" filed on Dec. 15, 2000, bearing Ser. No. 09/737,916, an application entitled "Apparatus and Methods for Scheduling Packets in a Broadband Data Stream" filed on Dec. 15, 2000, bearing Ser. No. 09/737,917, and an application entitled "Apparatus and Methods for Processing Packets in a Broadband Data Stream" filed on Sep. 13, 2000, bearing Ser. No. 09/661,244. These related applications are hereby incorporated by reference for all purposes.

FIELD OF THE INVENTION

This invention relates to apparatus and methods for establishing virtual private networks. In particular, this invention relates to apparatus and methods for establishing virtual private networks in a broadband network.

BACKGROUND OF THE INVENTION

As the Internet evolves into a worldwide commercial data network for electronic commerce and managed public data services, increasingly, customer demands have focused on the need for advanced Internet Protocol (IP) services to enhance content hosting, broadcast video and application outsourcing. To remain competitive, network operators and Internet service providers (ISPs) must resolve two main issues: meeting continually increasing backbone traffic demands and providing a suitable Quality of Service (QoS) for that traffic. Currently, many ISPs have implemented various virtual path techniques to meet the new challenges. Generally, the existing virtual path techniques require a collection of physical overlay networks and equipment. The most common existing virtual path techniques are: optical transport, asynchronous transfer mode (ATM)/frame relay (FR) switched layer, and narrowband internet protocol virtual private networks (IP VPN). FIG. 1 schematically illustrates the common existing virtual path switched layers.

The optical transport technique 102 is the most widely used virtual path technique. Under this technique, an ISP uses point-to-point broadband bit pipes to custom design a point-to-point circuit or network per customer. Thus, this technique requires the ISP to create a new circuit or network whenever a new customer is added. Once a circuit or network for a customer is created, the available bandwidth for that circuit or network remains static.

The ATM/FR switched layer technique 104 provides QoS and traffic engineering via point-to-point virtual circuits. Thus, this technique does not require the creation of dedicated physical circuits or networks, as is the case with the optical transport technique 102. Although this technique 104 is an improvement over the optical transport technique 102, this technique 104 has several drawbacks. One major drawback of the ATM/FR technique 104 is that this type of network is not scalable. In addition, the ATM/FR technique 104 also requires that a virtual circuit be established every time a request to send data is received from a customer.

The narrowband IP VPN technique 106 uses best effort delivery and encrypted tunnels to provide secured paths to the customers. One major drawback of a best effort delivery is the lack of guarantees that a packet will be delivered at all. Thus, this is not a good candidate when transmitting critical data.

Thus, it is desirable to provide apparatus and methods that reduce operating costs for service providers by collapsing multiple overlay networks into a multi-service IP backbone. In particular, it is desirable to provide apparatus and methods that allow an ISP to build the network once and sell such network multiple times to multiple customers.

SUMMARY OF THE INVENTION

The invention includes a method for establishing virtual private networks in a communication network. The method comprises the steps of creating a set of label switched path trunks, assigning a trunk label to each of the label switched path trunks, and configuring a set of logical service networks via multiprotocol labels to carry multiple virtual private network paths using the label switched path trunks. In an exemplary embodiment, each of the label switched path trunks provides a class of services and a trunk label associated with each label switched path trunk identifies the class of services provided by that trunk. In one embodiment, the creating step includes the step of creating the set of label switched path trunks at each service location. A service provider may wish to provide services at multiple service locations. In an exemplary embodiment, the logical service networks are configured statically via service provider input. In another exemplary embodiment, the logical service networks are configured automatically via software.

In one embodiment, the method further comprises the steps of stacking a trunk label on a multi-protocol label switching stack, assigning a unique identifier to a customer site and stacking the unique identifier on the trunk label. In another embodiment, the method further comprises the steps of assigning a unique group identifier to customer sites for a customer and establishing at least one virtual path between the customer sites.

The invention includes a virtual private network with a set of label switched path trunks. A label switched path trunk is defined for a class of services. A trunk label identifies the class of services for the label switched path trunk. A set of logical service networks are configured via multiprotocol labels to carry multiple virtual private network paths via the label switched path trunks.

A set of label switched path trunks may be defined at each service location. The set of logical service networks may be configured statically or automatically. In one embodiment, a trunk label is stacked on a multi-protocol label switching stack. A unique identifier may be assigned to a customer site by stacking it on the trunk label. A unique group identifier may be associated with customer sites for a designated customer. The virtual private network uses the unique group identifier to form at least one virtual path between the customer cites.

The invention allows service providers to reduce multiple overlay networks by creating multiple logical service networks (LSNs) on a physical or optical fiber network. The LSNs are established by the service provider and can be characterized by traffic type, bandwidth, delay, hop count, guaranteed information rates and/or restoration priorities. Once established, the LSNs allow the service provider to deliver a variety of services to multiple customers depending on each customer's traffic specifications. For example, different traffic specifications are serviced on different LSNs, depending on each LSN's characteristics. In addition, such LSNs, once built within a broadband network, can be customized and sold to multiple customers.

DETAILED DESCRIPTION OF THE INVENTION

Figure 1:
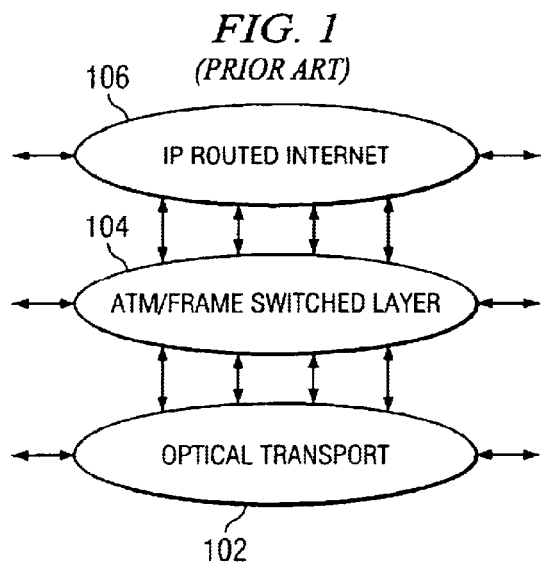
FIG. 1 schematically illustrates a prior art virtual path implementation.
Figure 2:
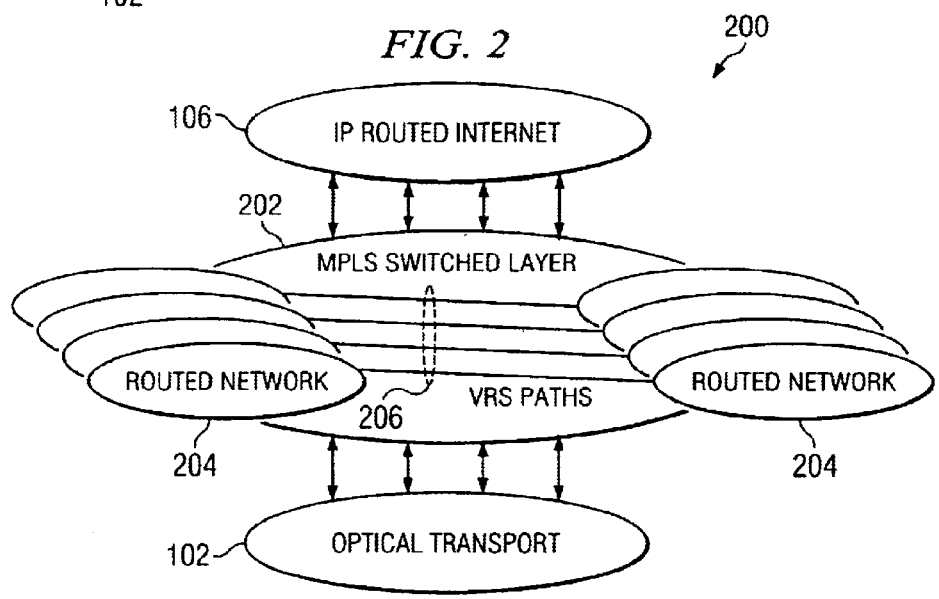
FIG. 2 schematically illustrates an exemplary virtual path implementation in accordance with an embodiment of the invention.

FIG. 2 schematically illustrates exemplary virtual path switched layers 200 in accordance with an embodiment of the invention. The virtual path switched layers 200 combine switching and routing to provide virtual services. In particular, the virtual path switched layers 200 combine the strengths of layer 106 (i.e., scalability and flexibility) and layer 202 (i.e., security and quality of service). In FIG. 2, a multi-protocol label switching (MPLS) switched layer 202 replaces the ATM/FR switched layer 104 in FIG. 1. Multiple label switched path trunks (LSP trunks) are set up as trunk groups in the optical transport layer 102 for transporting multiple virtual routing services (VRS) paths 206. The LSP trunks allow service providers to engineer traffic. In an exemplary embodiment, virtual routed networks 204 are located at the edge of the MPLS switched layer 202. The VRS paths 206 are connected to virtual routed networks 204 via the MPLS switched layer 202. In one embodiment, VRS routed networks 204 are uniquely identified; thus, security is guaranteed. In an exemplary embodiment, non-VRS traffic is routed to an Internet router via the IP routed Internet layer 106. In one embodiment, the virtual path switched layers 200 do not maintain Internet routing tables known in the art.

Figure 3:
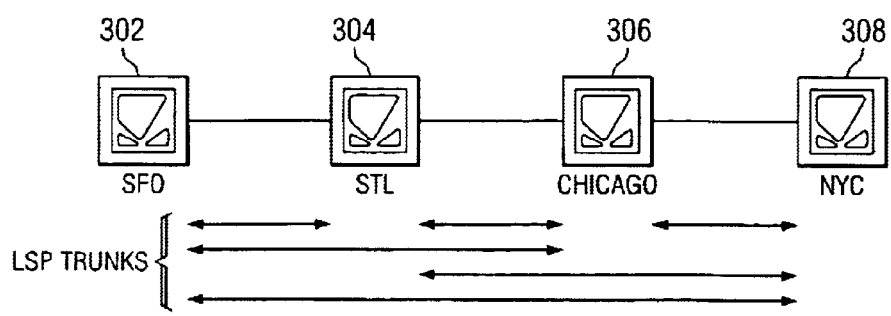
FIG. 3 schematically illustrates exemplary LSNs in accordance with an embodiment of the invention.

FIG. 3 schematically illustrates exemplary LSNs in accordance with an embodiment of the invention. A service provider creates LSP trunks at each location of service. For example, multiple LSP trunks are created in SFO, STL, Chicago, and NYC. In an exemplary embodiment, an LSP trunk is established for each service class. Each LSP trunk may be implemented using the technology described in the commonly assigned co-pending patent applications: "Apparatus and Methods for Managing Packets in a Broadband Data Stream" filed on Dec. 15, 2000, bearing Ser. No. 09/737,916, "Apparatus and Methods for Scheduling Packets in a Broadband Data Stream" filed on Dec. 15, 2000, bearing Ser. No. 09/737,917, and "Apparatus and Methods for Processing Packets in a Broadband Data Stream" filed on Sep. 13, 2000, bearing Ser. No. 09/661,244, which are expressly incorporated by reference.

In an exemplary embodiment, each LSP trunk is identified by a trunk label. In one embodiment, such trunk label also identifies the class of services assigned to the associated LSP trunk. In one embodiment, LSP trunk labels (302, 304, 306, and 308) are pushed onto an MPLS stack. LSNs are established based on the created LSP trunks. In one embodiment, LSNs are established statically by service provider input. In another embodiment, LSNs are established automatically by software. After LSNs are established or built, customer and customer traffic can be customizably added to such networks.

Figure 4:
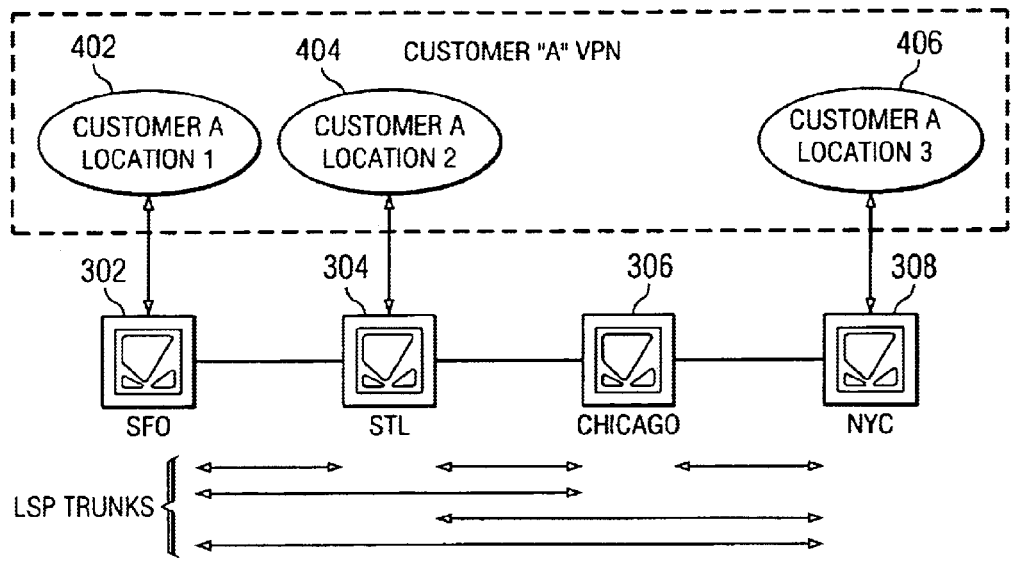
FIG. 4 schematically illustrates an exemplary VPN in accordance with an embodiment of the invention.

FIG. 4 schematically illustrates an exemplary VPN for a customer in accordance with an embodiment of the invention. In FIG. 4, a customer A signs up for services at multiple locations (customer sites). In one embodiment, each customer site is assigned a unique identifier (e.g., a VPN label). In an exemplary embodiment, such unique identifier is stacked on top of the trunk label in the MPLS stack. For example, in FIG. 4, customer A at location 1 is assigned a label 402 stacked on top of LSP trunk 302, customer A at location 2 is assigned a label 404 stacked on top of LSP trunk 304, and customer A at location 3 is assigned a label 406 stacked on top of LSP trunk 308. In an exemplary embodiment, customer sites for a customer are then grouped and assigned a unique VPN group label "A." The unique VPN group label "A" associates customer sites of customer A in a private network.

Figure 5:
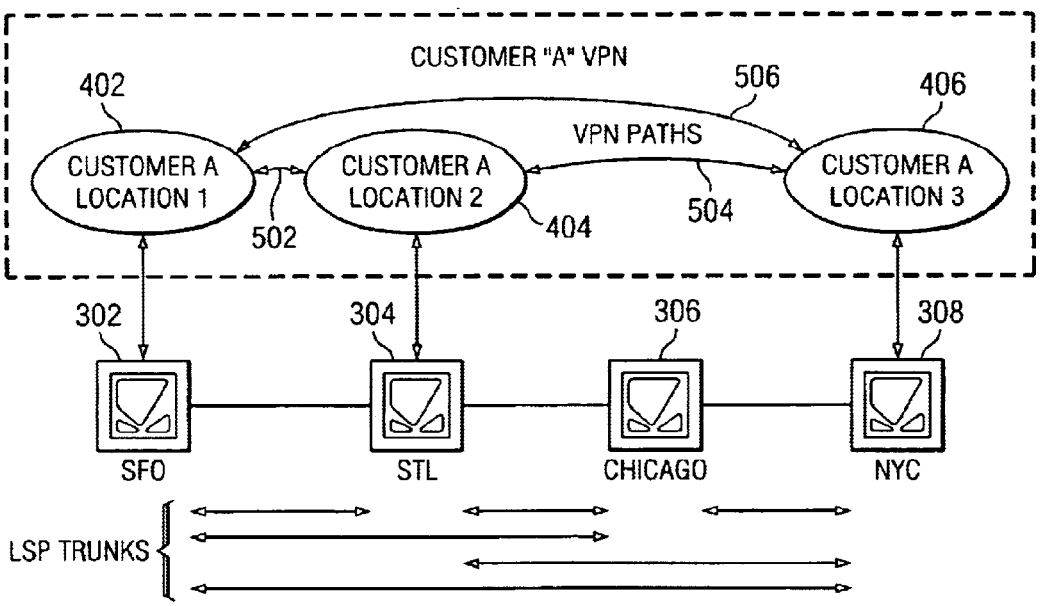
FIG. 5 schematically illustrates exemplary virtual paths for a customer in accordance with an embodiment of the invention.

FIG. 5 schematically illustrates exemplary virtual paths for a customer in accordance with an embodiment of the invention. A private IP path is established to route traffic between customer sites. For example, a private IP path 502 is established between location 1 and location 2, a private IP path 504 is established between location 2 and location 32 and a private IP path 506 is established between location 1 and location 3. In an exemplary embodiment, a private IP path is a logical path. The private IP paths, 502, 504, and 506 are unique to customer A and can be policed.

In one embodiment, private IP paths for each customer are associated to each other by a unique VPN group label. In an exemplary embodiment, the established private IP paths for each customer and the associated unique VPN group label provide security guarantees. In addition, the LSP trunks (302, 304, and 308) at each customer site associates data to a known quality and/or a class of service.

Figure 6:
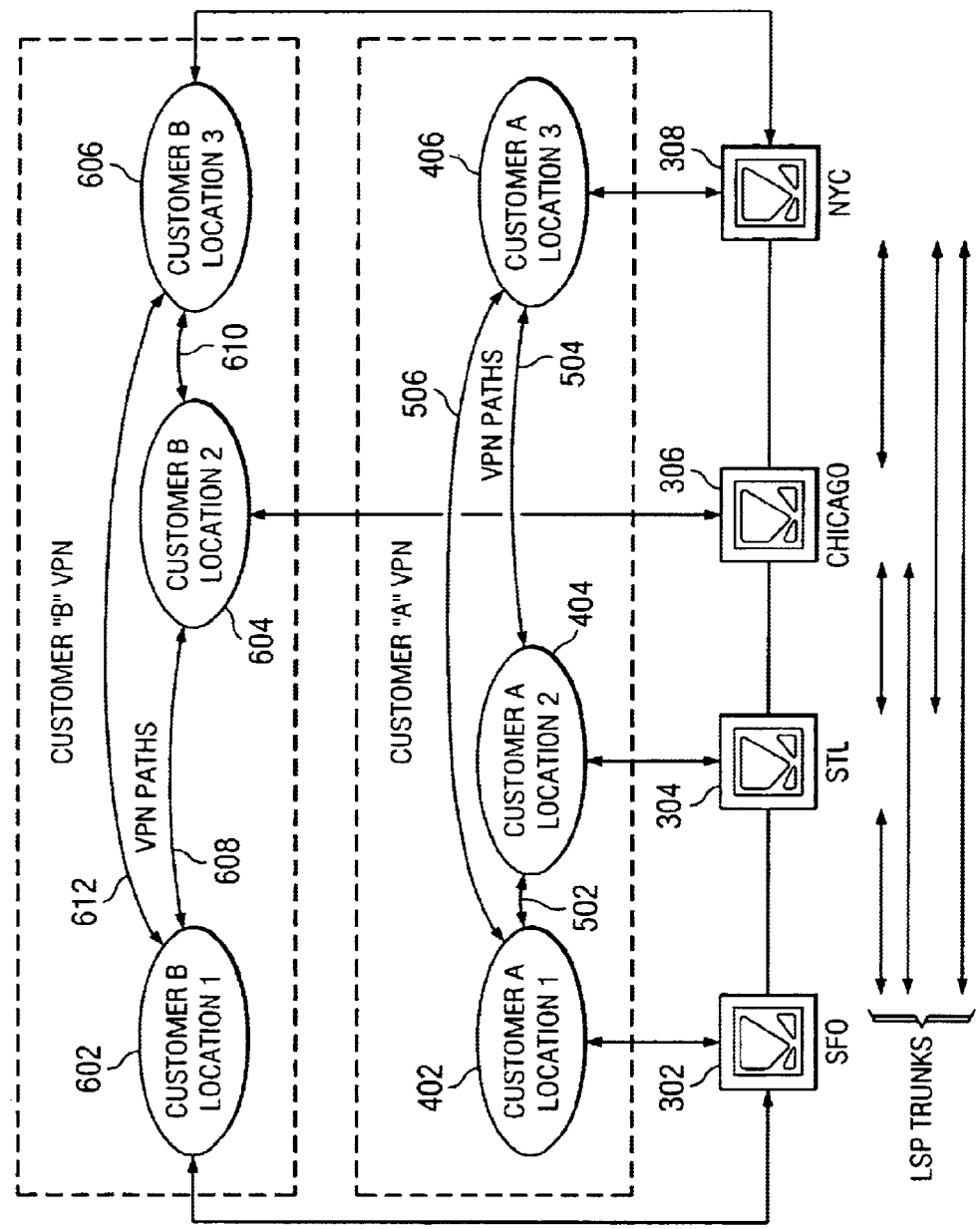
FIG. 6 schematically illustrates exemplary virtual paths for multiple customers in accordance with an embodiment of the invention.

FIG. 6 schematically illustrates multiple VPNs established for multiple customers in accordance with an embodiment of the invention. In FIG. 6, customer B signs up for services at multiple locations (customer sites). A unique VPN label is assigned to each customer site (location) for customer B. As shown, customer B at location 1 is assigned a label 602 stacked on top of LSP trunk 302, customer B at location 2 is assigned a label 604 stacked on top of LSP trunk 306, and customer B at location 3 is assigned a label 606 stacked on top of LSP trunk 308. In an exemplary embodiment, customer sites for customer B are then grouped and assigned a unique VPN group label "B." The unique VPN group label "B" associates customer sites for customer B in a private network. Next, a VPN for customer B is established. For example, a private IP path 608 is established between location 1 and location 2, a private IP path 610 is established between location 2 and location 3, and a private IP path 612 is established between location 1 and location 3. The private IP paths, 608, 610, and 612 are unique to customer B and can be policed.

Generally, the separation of the service plane from the network provides significant scalability advantages, in the sense that the network does not need to know about the end services offered beyond providing the proper quality of service (QOS) transport. For example, a carrier can establish QOS parameters and design a network using a mesh of LSP trunks. The LSP trunks signaling is propagated and threaded from node-to-node using, for example, common signaling techniques like resource reservation protocol (RSVP) or constraint routing-label distribution protocol (CR-LDP). Network and trunk redundancy parameter get established in advance. After the network is established, the carrier can add customers at the edge of the network. Edge services get signaled end-to-end regardless of whether the network or the LSP trunks are aware that such signaling is taking place. In a sense, the service creation only affects the end node where the service is actually being created. Thus, service creation is scalable because it is signaled from end-to-end. Any failure in the network gets dealt with at a network level, for example, by restoring LSP trunks which are usually an order of magnitude lower than the number of services that run on those trunks.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for establishing virtual private networks in a communication network, comprising the steps of:
    creating a plurality of label switched path trunks, each of said label switched path trunks providing a class of services;
    assigning a trunk label to each of said label switched path trunk, said trunk label identifying a class of services for said label switched path trunk; and
    configuring a set of logical service networks via multi-protocol labels to carry multiple virtual private network paths using said label switched path trunks.

2. The method of claim 1, wherein said creating step includes the step of:
    creating said plurality of label switched path trunks at each service location.

3. The method of claim 1, wherein said configuring step includes the step of:
    statically configuring said logical service networks.

4. The method of claim 1, wherein said configuring step includes the step of:
    automatically configuring said logical service networks.

5. The method of claim 1, further comprising the step of:
    stacking said trunk label on a multi-protocol label switching stack.

6. The method of claim 5, further comprising the steps of:
    assigning a unique identifier to a customer site; and
    stacking said unique identifier on said trunk label.

7. The method of claim 1, further comprising the step of:
    characterizing each of said logical service networks with parameters selected from the group comprising: traffic type, bandwidth, delay, hop count, guaranteed information rates, and restoration priorities.

8. The method of claim 1, further comprising the steps of:
    assigning a unique group identifier to customer sites for a customer; and
    establishing at least one virtual path between said customer sites.

9. The method of claim 1, further comprising the step of:
    propagating signals from node-to-node among said label switched path trunks.

10. The method of claim 1, further comprising the step of:
    propagating signals from end-to-end among said logical service networks.

11. A virtual private network, comprising:
    a plurality of label switched path trunks, each of said label switched path trunks providing a class of services;
    a trunk label identifying a class of services for each of said label switched path trunks; and
    a set of logical service networks configured via multiprotocol labels to carry multiple virtual private network paths via said label switched path trunks.

12. The virtual private network of claim 11, further comprising a plurality of label switched path trunks at each service location.

13. The virtual private network of claim 11, wherein said set of logical service networks is statically configured.

14. The virtual private network of claim 11, wherein said set of logical service networks is automatically configured.

15. The virtual private network of claim 11, wherein said trunk label is stacked on a multi-protocol label switching stack.

16. The virtual private network of claim 15, further comprising a unique identifier assigned to a customer site, wherein said unique identifier is stacked on said trunk label.

17. The virtual private network of claim 11, wherein each of said logical service networks is characterized by parameters selected from the group comprising: traffic type, bandwidth, delay, hop count, guaranteed information rates, and restoration priorities.

18. The virtual private network of claim 11, further comprising a unique group identifier associated with customer sites for a designated customer, said virtual private network using said unique group identifier to form at least one virtual path between said customer cites.

19. The virtual private network of claim 11, wherein signals from said label switched path trunks are propagated from node to node among said label switched path trunks.

20. The virtual private network of claim 11, wherein signals from said logical service networks are propagated from end to end among said logical service networks.

* * * * *

UNITED STATES PATENT AND TRADEMARK OFFICE
CERTIFICATE OF CORRECTION

PATENT NO. : 6,847,641 B2
DATED : January 25, 2005
INVENTOR(S) : Michael Kazban et al.

It is certified that error appears in the above-identified patent and that said Letters Patent is hereby corrected as shown below:

Column 4,
Line 20, after "location 2 and location" delete "32" and insert -- 3 --.

Signed and Sealed this

Twenty-eighth Day of June, 2005

JON W. DUDAS
*Director of the United States Patent and Trademark Office*